UNITED STATES PATENT OFFICE 2,362,479

ANTIOXIDANT FOR RUBBER

Carlin F. Gibbs, Cuyahoga Falls, Ohio, assignor to The B. F. Goodrich Company, New York, N. Y., a corporation of New York No Drawing. Application August 4, 1943, Serial No. 497,365

11 Claims. (Cl. 260—800)

This invention relates to the preservation of organic materials which tend to deteriorate by absorption of oxygen from the atmosphere and to the means for preventing such deterioration. This application is a continuation-in-part of my copending application Serial No. 405,790 filed August 7, 1941.

The preservation of such materials may be accomplished by incorporating in the material to be preserved, as an antioxidant, a hydroxyaryl derivative of 2-methyl 2-alkyl dihydrobenzofurane. Among the materials which may be thus preserved are fatty oils such as linseed or tung oil, petroleum oils such as gasoline, fish oils, aldehydes, soaps, turpentine, rubbers and the like. Among the rubbers, vulcanized or unvulcanized, which may be preserved with my new compounds are all the natural rubbers such as caoutchouc, balata, gutta percha, latex, as well as artificial rubber isomers, and such synthetic rubbers as neoprene and the copolymers of butadiene-1,3 hydrocarbons with acrylonitrile, styrene, methyl acrylate, methyl methacrylate, isobutylene, or the like. The term "a rubber" as used in the claims is intended to designate all of the above-mentioned materials.

The hydroxyaryl dihydrobenzofuranes which act as antioxidants are of the general formula

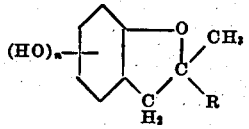

in which R is hydrogen or an alkyl group, and $n$ is an integer less than three. Among these compounds are 2-methyl-4-hydroxy dihydrobenzofurane, 2-ethyl-4-hydroxy dihydrobenzofurane, 2,2-dimethyl-4-hydroxy dihydrobenzofurane, 2,2-dimethyl-5-hydroxy dihydrobenzofurane, 2,2-dimethyl-6-hydroxy dihydrobenzofurane, 2,2-dimethyl-7-hydroxy dihydrobenzofurane, 2-methyl-2-ethyl-5-hydroxy dihydrobenzofurane, 2-methyl-2-propyl-4-hydroxy dihydrobenzofurane, 2-methyl-2-amyl-6-hydroxy dihydrobenzofurane, 2,2-dimethyl-4,6-dihydroxy dihydrobenzofurane, 2,2-dimethyl-4,7-dihydroxy dihydrobenzofurane, 2,2-dimethyl-5,7-dihydroxy dihydrobenzofurane, 2-methyl 2-propyl-4,5-dihydroxy dihydrobenzofurane, 2,2-dimethyl-6,7-dihydroxy dihydrobenzofurane and the like.

As a specific example of my invention I will describe the preparation of 2,2-dimethyl-5-hydroxy dihydrobenzofurane as well as its use as an antioxidant in rubber. The most convenient starting materials for the synthesis of this compound are hydroquinone and beta-methallyl chloride. These materials, in the ratio of two molecular proportions of hydroquinone to one molecular proportion of beta-methallyl chloride, are refluxed with about 1.5 molecular proportions of 10% alcoholic potash for about two hours. After cooling the mixture any diether may be filtered off. After acidification the mono ether may be filtered off, washed, and dried. Other beta-alkyl allyl ethers may be prepared by similar reaction.

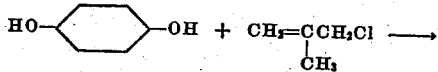

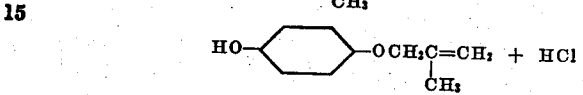

The mono ether may readily be rearranged to the o-beta-methallyl derivative by heating with about one-half its weight of diethylaniline as solvent for about ten minutes at 225° to 250° C. Other solvents, such as dimethylaniline or various hydrocarbons may also be employed. The product, which boils at 130° to 140° C. at 3 mm. pressure and which melts at 82° to 84° C., may readily be separated from the reaction mixture by fractional distillation at reduced pressure.

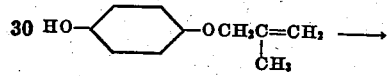

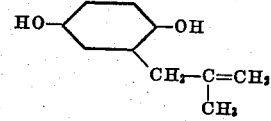

Ring closure of the alkenyl derivative is readily accomplished by heating it with pyridine hydrochloride in the ratio of one molecular proportion of isobutenyl hydroquinone to two molecular proportions of pyridine hydrochloride. Usually a heating period of ten to twenty minutes at 200° to 225° C. suffices. The product, 2,2-dimethyl-5-hydroxy dihydrobenzofurane, may be separated from the reaction mixture by washing with water and sodium bisulfite solution, drying, and distilling at reduced pressure. The product boils at 100° to 118° C. at 3 mm. pressure and melts at 101° to 102° C.

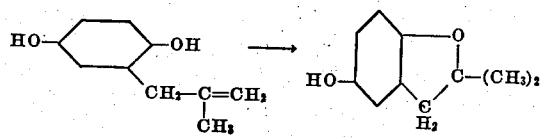

Other compounds of similar structure may be prepared by starting with the appropriate polyhydroxy benzene and beta-alkyl substituted allyl halide. The beta-alkyl group keeps its same position in the hydrocarbon chain after the rearrangement of the ether and the cyclization reaction. The position of hydroxy groups in the benzene ring has little effect upon the course of the reaction; however, the hydroxy group which is etherified in the first step of the reaction must have at least one ortho position open in order for the desired rearrangement to take place. Instead of using a polyhydroxy benzene as the starting material, an alkoxy dihydroxy benzene may be employed. Such compounds as hydroquinone, catechol, resorcinol, hydroxy hydroquinone, pyrogallol, phloroglucinol, and the like are useful starting materials. Among the beta-alkyl allyl halides which may be used are beta-methallyl, beta-ethylallyl, beta-propylallyl, beta-butylallyl, beta-hexylallyl, etc., chloride or bromide.

As an example of the antioxidant effect of these compounds the following rubber compositions were prepared, in which the parts are by weight:

|  | A | B |
| --- | --- | --- |
| Rubber | 100 | 100 |
| Zinc oxide | 123 | 123 |
| Titanium dioxide | 14 | 14 |
| Sulfur | 2 | 2 |
| Paraffin wax | 1 | 1 |
| Stearic acid | 0.8 | 0.8 |
| Ultramarine blue | 0.2 | 0.2 |
| Accelerator | 1 | 1 |
| 5-Hydroxy-2,2-dimethyl dihydrobenzofurane |  | 1 |

The two compositions were vulcanized in a press at 280° F. and were then tested in a Di Mattia flexing machine at room temperature. The samples were inspected after the indicated number of flexures and were given a rating between 0 (no cracks) and 10 (complete rupture). The results are as follows:

| Number of flexures, thousands | Rating | |
| --- | --- | --- |
| | A | B |
| 100 | 0 | 0 |
| 200 | 0 | 0 |
| 300 | 0.5 | 0 |
| 400 | 1.0 | 0 |
| 500 | 2.5 | 0 |
| 1,000 | 8 | 1 |
| 1,400 | 9.5 | |
| 1,500 | | 2 |
| 1,700 | 10 | |
| 2,000 | | 5 |
| 3,200 | | 9 |
| 3,800 | | 10 |

As is clear from the table, the rubber composition containing 5-hydroxy-2,2-dimethyl dihydrobenzofurane withstood more than twice as many flexures before rupture as did the rubber composition containing no antioxidant. Similar results may be obtained with other similar compounds.

Any of the usual pigments, fillers, dyes, reinforcing agents, softeners, vulcanizing agents, accelerators, other antioxidants, and the like may also be present in the rubber composition. Rubber compositions containing my new antioxidants may be used for a variety of purposes, such as for tire treads or tubes, hose, belting, footwear, molded goods, and the like. Such rubber compositions may be vulcanized in any of the usual ways, such as in steam, hot air, or in a mold.

The rubber or other material may be treated with the antioxidants by any of the usual methods. The antioxidant may be used as a solid or in the form of a solution; it may be mixed with the rubber latex before coagulation, or it may be added to the solid rubber on a roll mill or in an internal mixer, or it may be applied to the surface of the finished rubber article. In general, from 0.1 to 5.0 percent or more of my new compounds are effective to retard the deterioration of the materials in which they are incorporated.

Although I have herein disclosed specific embodiments of my invention, I do not intend to limit myself solely thereto, but only to the extent indicated in the appended claims.

I claim:

1. The method of retarding the deterioration of an organic compound which tends to deteriorate by absorption of oxygen from the air which comprises treating it with a compound having the structure

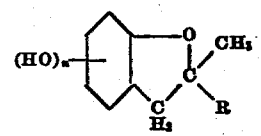

in which R is a member of the class consisting of hydrogen and alkyl groups and $n$ is an integer less than three.

2. The method of retarding the deterioration of a rubber which comprises treating it with a compound having the structure

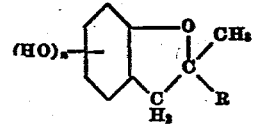

in which R is a member of the class consisting of hydrogen and alkyl groups and $n$ is an integer less than three.

3. The method of retarding the deterioration of rubber which comprises treating it with a compound having the structure

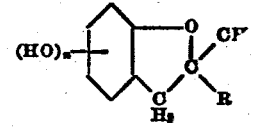

in which R is a member of the class consisting of hydrogen and alkyl groups and $n$ is an integer less than three.

4. The method of retarding the deterioration of a rubber which comprises treating it with a compound having the structure

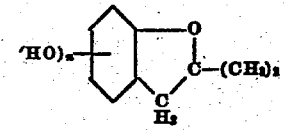

in which $n$ is an integer less than three.

5. The method of retarding the deterioration of a rubber which comprises treating it with a compound having the structure

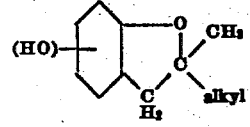

6. The method of retarding the deterioration of a rubber which comprises treating it with 2,2-dimethyl-5-hydroxy dihydrobenzofurane.

7. A composition comprising a rubber and a compound having the structure

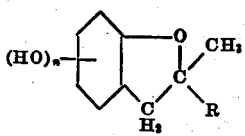

in which R is a member of the class consisting of hydrogen and alkyl groups and $n$ is an integer less than three.

8. A composition comprising rubber and a compound having the structure

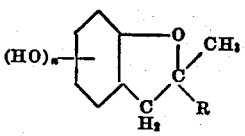

in which R is a member of the class consisting of hydrogen and alkyl groups and $n$ is an integer less than three.

9. A composition comprising a rubber and a compound having the structure

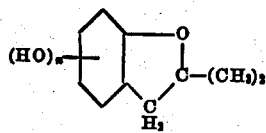

in which $n$ is an integer less than three.

10. A composition comprising a rubber and a compound having the structure

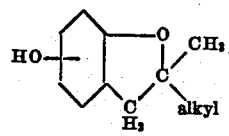

11. A composition comprising a rubber and 2,2-dimethyl-5-hydroxy dihydrobenzofurane.

CARLIN F. GIBBS.